(12) United States Patent
Cherubini et al.

(10) Patent No.: US 9,218,277 B2
(45) Date of Patent: Dec. 22, 2015

(54) WEAR LEVELING

(75) Inventors: Giovanni Cherubini, Zurich (CH); Ilias Iliadis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/469,148

(22) Filed: May 11, 2012

(65) Prior Publication Data

US 2012/0297123 A1  Nov. 22, 2012

(30) Foreign Application Priority Data

May 19, 2011  (EP) ..................................... 11166647

(51) Int. Cl.
*G06F 12/00* (2006.01)
*G06F 12/02* (2006.01)

(52) U.S. Cl.
CPC .... *G06F 12/0246* (2013.01); *G06F 2212/7211* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 5,341,339 A * | 8/1994 | Wells | 365/185.11 |
| 5,388,083 A * | 2/1995 | Assar et al. | 365/185.33 |
| 5,544,356 A * | 8/1996 | Robinson et al. | 707/821 |
| 7,409,490 B2 | 8/2008 | Liu | |
| 2008/0094914 A1* | 4/2008 | Park et al. | 365/185.24 |
| 2010/0174845 A1* | 7/2010 | Gorobets et al. | 711/103 |
| 2010/0318719 A1* | 12/2010 | Keays et al. | 711/103 |
| 2010/0325340 A1* | 12/2010 | Feldman et al. | 711/103 |
| 2011/0302359 A1* | 12/2011 | Schmidberger | 711/103 |
| 2012/0297123 A1 | 11/2012 | Cherubini et al. | |

FOREIGN PATENT DOCUMENTS

| | | |
|---|---|---|
| CN | 101655819 A | 2/2010 |
| WO | WO 94/23432 | 10/1994 |
| WO | WO 2010144139 A2 | 12/2010 |

OTHER PUBLICATIONS

Li-Fu Chou, Efficient Allocation Algorithms for FLASH File Systems, 2004.*
Micron Technology Inc., TN-29-42: Wear-Leveling Techniques in NAND Flash Devices, 2008.*
Gal, et al., "Algorithms and Data Structures for Flash Memories", ACM Computing Surveys, vol. 37, No. 2, Jun. 2005, pp. 138-163.
ELNEC, NAND Flash Memories and Programming NAND Flash Memories Using ELNEC Device Programmers, Aug. 2008.

(Continued)

*Primary Examiner* — Aimee Li
*Assistant Examiner* — Alex Olson
(74) *Attorney, Agent, or Firm* — Scully, Scott, Murphy & Presser, P.C.; Jennifer Davis, Esq.

(57) ABSTRACT

A method for operating a computer memory. The memory is organized to store data in units of such memory. For each unit of a set of units a wear level of the unit is determined. A maximum wear level among the wear levels is determined. A suggestion of a subset of one or more units for being selected for data erasure is received and at least one unit in the subset is identified for subsequent data erasure, a wear level (c(i)) of which units (i) is less than the maximum wear level (c_max).

13 Claims, 3 Drawing Sheets

(56) References Cited

OTHER PUBLICATIONS

Perdue, "Wear Leveling", SPANSION, Publication No. Wear_Leveling_AN, Revision 02, Issue Date: Jun. 15, 2010, pp. 1-7.
Office Action dated Jan. 27, 2014, received in a related U.S. Appl. No. 13/597,861.

* cited by examiner a)

b)

WEAR LEVELING

CROSS REFERENCE TO RELATED APPLICATION

This application claims priority under 35 U.S.C. 119 from European Patent Application Number 11166647.5, filed May 19, 2011, the entire contents of which are incorporated herein by reference.

BACKGROUND OF THE INVENTION

1. Field of the Invention

The present invention relates to a method, a computer program product, and a device for operating a computer memory.

2. Description of Related Art

Solid-state memory devices encompass rewritable non-volatile memory devices which may use electronic circuitry for storing data. Currently, solid-state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

However, writing data to a solid-state memory device such as a flash memory device requires paying attention to specifics in the flash technology: NAND Flash memory is organized in units of pages and blocks. Multiple pages form a block. While read and write operations can be applied to individual pages, erase operations can only be applied to entire blocks. And while in other storage technologies outdated data can simply be overwritten by new data, Flash technology requires an erase operation before new data can be written to an erased block.

Another specific in Flash technology is that today's Flash memory devices are limited to a finite number of Program Erase (PE) cycles. A Flash memory device typically has an endurance specification that defines its maximum number of PE cycles. Therefore, a writing technique is applied called "write out of place" in which new or updated data is written to some free page offered by a free page allocator instead of writing it to the same page where the out-dated data resides. The page containing the out-dated data is marked as invalid page. By such means, the life expectancy of Flash-based solid-state drives (SSD) and also log-structured file systems may be extended, since erase cycles needed for directly overwriting data in a block are avoided.

However, available free pages may be exhausted over time. Instead, the blocks of the Flash memory device may be occupied by a mix of valid and invalid pages. New free space needs to be created by a block reclaiming process, also denoted as garbage-collection process, which reclaims space occupied by out-dated, i.e. invalid, data. A block reclaiming process first identifies blocks for erasing based on a given policy. Then, valid data residing in such blocks is copied (relocated) to other blocks containing free pages, and finally the subject blocks are erased so that they become available for rewriting.

The block reclaiming mechanism introduces additional read and write operations the extent of which depends on the specific policy deployed as well as on the system parameters. Such additional writes are also referred to as "write amplification" phenomenon. The write amplification negatively affects the lifetime and endurance of SSDs since it produces data elsewhere which need to be erased sooner or later again, and it slows down the overall performance of the Flash memory device.

A Flash memory device may even stop operating when only a small fraction of its blocks are worn out. In this case, there may still be blocks that are either unused or underused. Wear-leveling algorithms ensure that erasures are distributed more evenly across the Flash memory blocks.

SUMMARY OF THE INVENTION

According to one aspect of the present invention, a method is provided for operating a computer memory that is organized to store data in a set of units of the memory. The method includes determining a wear level of each of the units of the set and identifying a maximum wear level among the determined wear levels; receiving a suggestion of a subset including one or more units for being selected for data erasure; and identifying at least one unit in the subset having a wear level which is less than the maximum wear level, for subsequent data erasure. In one preferred embodiment of the method, for each unit of the subset, the unit will be dropped from being selected for data erasure if the wear level of that unit is equal to the maximum wear level, unless the wear level of each of the other units of the set is equal to the maximum wear level.

In accordance with another aspect of the present invention, a tangible computer readable medium has computer readable program code embodied on or in it. The computer readable program code, when read and executed by a computer, will cause the computer to perform the above method.

In accordance with a further aspect of the present invention, a storage device includes: a memory containing a set of units; and a controller adapted to (i) determine a wear level of each of the units of the set and to identify a maximum wear level among the determined wear levels, (ii) receive suggestion of a subset of one or more units for being selected for data erasure; and (iii) identify at least one unit in the subset having a wear level which is less than the maximum wear level, for subsequent data erasure. In one preferred embodiment, for each unit of the subset, the unit will be dropped from being selected for data erasure if the wear level of that unit is equal to the maximum wear level, unless the wear level of each of the other units of the set is equal to the maximum wear level.

BRIEF DESCRIPTION OF THE DRAWINGS

The present invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE PREFERRED EMBODIMENTS

Figure 1:
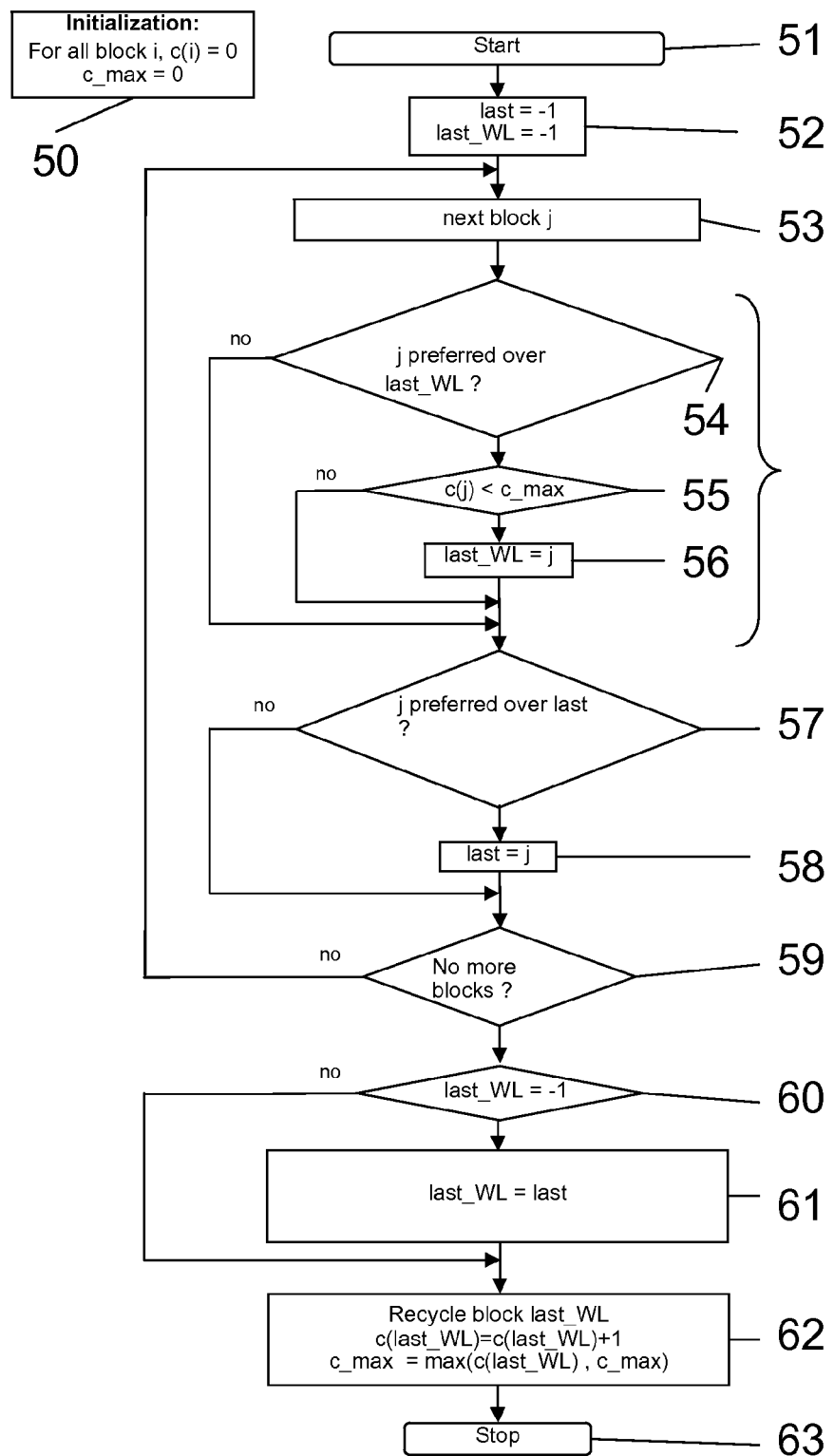
FIG. 1 a flow diagram of a method according to an embodiment of the present invention.

According to one aspect of the present invention, a method is provided for operating a computer memory wherein the memory is organized to store data in a set of units of the memory. For each of the units of the set a wear level is determined and a maximum wear level among the determined wear levels is identified. A suggestion of a subset of one or more units for being selected for data erasure is received. At least one unit in the subset is identified, which has a wear level less than the maximum wear level, for subsequent data erasure. In the step of identifying, it is preferable that a unit of the subset is dropped from being selected for data erasure if the wear level of the unit is equal to the maximum wear level, unless the wear level of each of the other units of the set is equal to the maximum wear level.

According to a further aspect of the present invention, a storage device is provided. The storage device includes a memory made up of a set of units. A controller is adapted to determine a wear level of each of the units of the set and to identify a maximum wear level among the determined wear levels. The controller is further adapted to receive suggestion of a subset of one or more units for being selected for data erasure. The controller is further adapted to identify at least one unit in the subset, a wear level of which is less than the maximum wear level, for subsequent data erasure. It is preferable that, for each unit of the subset, the unit will be dropped from being selected for data erasure if the wear level of that unit is equal to the maximum wear level, unless the wear level of each of the other units of the set is equal to the maximum wear level.

As an introduction to the following description, it is first pointed at a general aspect of the present invention concerning wear leveling in memory devices suffering from wear. Such memory device preferably may be solid state memory devices, such as Flash memories, phase change memories, magnetic RAM memories, etc. In the following description references are made to Flash technology terminology, for example, when it is referred to blocks instead of units and to pages instead of subunits. Nevertheless, it is understood that for the entire application neither the content nor the scope of protection shall be restricted to the Flash memory technology. Any other solid state storage technology shall be encompassed, as is any log structured file system making use of a storage device in a log-structured way.

In such memory devices, the wear of a set of memory units is monitored, so that an instantaneous maximum wear is observed. The set of memory units may preferably include all units available in the memory device, or may include all units available for storing user data in the memory device, or generally may include a number of units less than the number of units available in the memory device. Wear in the present context may rather be a matter of usage than of pure age. There may be various ways for determining a wear, however, in a preferred embodiment, the number of erase cycles a unit was exposed to in the past may serve as a representation of the level of wear. In this example, the wear level is not a relative measure with respect to a maximum wear level allowed or achievable but is an absolute measure that is comparable to the wear levels of other units.

It is preferred, that the instantaneous wear level is determined, monitored and stored for each unit. Hence, the present wear status of a unit may be available at every time needed. Out of all variables representing the instantaneous wear levels of the associated units in the set of units, it is searched for the variable indicating the maximum wear level. There may be different ways for determining the maximum wear level representing the one or more most worn out units in the set of units. Given that a variable shows a higher level the higher the wear is, a search for the maximum wear level may result in a max search among the variables. Preferably, an identifier identifies the instantaneous maximum wear level per unit of the set. For the present idea it may be sufficient that a value representing the maximum wear is identified among all the wear levels determined for the units of the set such that it may not be critical to learn which one of these units is the most worn out.

Subject to the overall processing, at some point in time there may be a request to verify if one or more units may be suitable for being erased and make the unit available for new writes. Such request received may in the following also be denoted as suggestion of a subset of one or more units for data erasure. The subset typically represents a number of units from the set of units which number is smaller than the number of units belonging to the set. However, in a different embodiment, the subset of units may be identical to the set of units. In one embodiment, there may be a process such as a unit reclaiming process for preselecting units for a possible future data erasure. In one embodiment, such preselecting may involve a characteristic which units may be better suited for erasure than others wherein such characteristic may be different than wear, and specifically be different than the wear levels assigned to the respective units. Such characteristic may, for example, be the amount of valid data residing in a unit for the reason that in write-out-of-place concepts any still valid data needs to be relocated to another location. In such way, a preselection may include an evaluation with respect to a validity characteristic of a unit. If a unit includes a set of subunits for storing data, such validity characteristic may depend on validity characteristics assigned to the individual subunits of the respective unit. For example, a flag may be assigned to each subunit indicating that the subunit includes valid or invalid data. Such flag may be interpreted as characteristic to the subunit. The characteristic of the unit may result from an accumulation of the characteristics of the associated subunits, and may result in an integer number representing the number of its subunits containing valid data.

The subset of units suggested for data erasure may preferably include one of the following: a single unit; multiple units; all units of the set of units. Whenever the subset contains more than one unit, the units may be received as a list, or one by one in consecutive manner.

Any suggested unit is evaluated in that its wear level may be compared to the maximum wear level. In case the wear level is below the maximum wear level, the subject unit may generally be suitable for being erased; however, additional criteria may be applied for determining if the subject unit finally will be selected for erasure, or if another unit also producing a wear level less than the maximum wear level may better be suited along such other criteria. In this context, it is attempted to identify at least one unit in the subset for subsequent data erasure, a wear level of which at least one unit is less than the maximum wear level.

On the other hand, it may be preferred that a or each unit of the subset the wear level of which unit is equal to the maximum wear level is dropped from being selected for data erasure. However, in case all units of the subset suggested for being selected for data erasure show a wear level equal to the maximum wear level, it is preferred to identify a unit with a wear level less than the maximum wear level out the units outside the subset. In case such unit is identified it may be the preferred unit for a subsequent data erasure. In such scenario, all units of the set of units may need to be investigated as to their wear level. It is preferred, that only if the wear level of each of the other units of the set is equal to the maximum wear level, the presently considered unit out of the subset of suggested units may be identified for data erasure although its associated wear level is equal to the maximum wear level either for the reason that no other unit could be identified within the set of units with a wear level less than the maximum wear level. In such scenario, it may be preferred that either at least one of the units out of the subset of units is identified for erasure according to a criterion different than wear since from a wear point of view there is no preference among the units suggested in the subset, or one of the units out of the set of units is identified for erasure according to a criterion different than wear since from a wear point of view there is no preference among the units suggested in the set.

Hence, in case all the units suggested in the subset show a wear level equal to the maximum wear level, it is preferred that none of the blocks suggested in the subset will be erased and instead one or more blocks not suggested in the subset but showing a wear level less than the maximum wear level will be selected for erasure, since such units may still be existing in the set of units. In terms of processing, this may be implemented by either the wear leveling process taking over from the block reclaiming scheme and searching for such blocks, or the wear levelling process returning to the block reclaiming scheme and requesting for a suggestion of one or more additional blocks.

In block/page terminology, the wear leveling process selects one or more blocks out of the set of blocks to erase that exhibit a wear level that is less than the instantaneous maximum wear level among the blocks in the set. This approach results in the following advantages over previous approaches: The present approach can be combined with any block reclaiming scheme that may focus on criteria different than wear, and as such may be combined with any garbage collection scheme and still assign sufficient weight to the problem of wear in the overall process. For this reason, a process for reclaiming blocks focusing on the avoidance of write amplification may be implemented and the present wear leveling approach may correct any decisions taken by the block reclaiming scheme that inappropriately favor a block selection at the cost of wear.

In addition, the present approach provides an excellent degree of wear leveling in that the wear imbalance among all the blocks is minimized throughout the operation of the memory device. It avoids additional costly operations to maintain a sufficient degree of wear leveling among the blocks. It prolongs the lifetime of the memory device since when the memory device is declared as unusable for the reason that one or more blocks basically exceed a wear level threshold, the degree of usage of all blocks is essentially the same.

Hence, a new approach for performing efficient wear leveling in SSD devices is proposed. By means of monitoring the wear level of each block in the set of blocks, by identifying an instantaneous maximum wear level and by selecting one or more blocks for erasure that exhibit a wear level that is less than the instantaneous maximum wear level, an efficient wear leveling approach is proposed suitable for solid state storage devices, whereby all blocks in the set monitored undergo essentially the same degree of usage to prolong the lifetime of the device. The same mechanism may be applied to any memory structure in which new or updated data are written out-of-place, i.e. where data updates to out-dated data are not written to the subunit containing the out-dated data but to a log which provides a series of free subunits where data is to be written to. Such subunits typically may not be subunits subsequent to each other in the organization of the storage device but may be scattered around the storage device and be offered by an allocation engine. Such systems may be referred to as log-structured file systems.

Typically, the present wear leveling process is triggered together with or from a block reclaiming process which in turn is started when there is a need recognized for freeing blocks for writing new data to, which requires a previous erasure of all data on such blocks. The more data is written over time to the device, the less free pages may be available and new blocks may need to be reclaimed for a free block queue, i.e. a queue for providing free, erased blocks for writing new or updated data to. New free blocks need to be reclaimed from blocks filled with valid and/or invalid data. The block reclaiming process first identifies blocks for cleaning based on a given policy. Then valid data still residing in these blocks is copied/relocated to other blocks, and finally the blocks that now are free from valid data are erased and become available again for rewriting. While this procedure requires some additional write operations in excess, it is apparent that by such approach immediate erase operations are avoided which would contribute to a much higher overall processing time than an overhead of some additional write operations do.

The proposed real-time wear leveling scheme can be combined with any block reclaiming scheme and, in an embodiment, may work as follows: The wear level of each block is registered in an individual counter. An additional counter referred to as max_counter is provided for keeping track of the instantaneous maximum value over all counters. When a block is erased, the content of the corresponding counter is increased by one. Furthermore, if this new value exceeds the value of the max_counter, then also the max_counter is increased by one. To identify a block for recycling, the block reclaiming process may consider blocks according to a specific sequence and may examine, for example, their number of valid pages. This process terminates when a block is found that contains a number of valid pages that satisfies a given criterion. According to the proposed scheme, the process preferably terminates when the wear of the block found is less than the instantaneous maximum wear monitored up to this point in time, which is registered in the max_counter.

FIG. 1 shows a flow diagram of a method according to an embodiment of the present invention.

In an initialization step 50 an erase counter <c(i)> representing a variable for the wear level for the block i is set to zero for each block of a set of blocks. The erase counter <c(i)> represents a variable of the erase cycles applied to the block i in the past, and as such represents the wear level of the block i, which wear level in some instances is also referred to as age of the block. A counter <c_max> is also set to zero. The counter <c_max> delivers a level representing the maximum wear level that is assigned to any of the counters <c(i)>.

In step 51a block reclaiming process is started, for example, in view of limited resources to write new data to. The initialization step 50 may of course be integrated into the starting step 51, too. In step 52, a <last> identifier, i.e. a first identifier, is set to minus one. The <last> identifier is an identifier for the block that currently would have been selected by the block reclaiming process, i.e. which would be recycled by the garbage collection process in the absence of the proposed wear-leveling feature. In the same step 52, a <last_WL> identifier, i.e. a second identifier, is set to minus one. The <last_WL> identifier is an identifier for the block that is selected for recycling by the block reclaiming process in the presence of the proposed wear-leveling feature.

In the following, it is considered that the block reclaiming process will examine a set of blocks of the memory device according to a given sequence. The sequence can be fixed, such as in the case, for example, of the so-called greedy garbage collection process where all blocks are examined, or it can be dynamic where the search is stopped when a set of criteria are fulfilled. An end of the search is verified in step 59. In the present example, the block reclaiming process considers one block after the other in a given sequence. Any block out of the set of blocks is considered in the block reclaiming scheme and is suggested to the wear leveling feature, such that a subset of blocks suggested for data erasure represents the entire set of blocks investigated in the block reclaiming scheme. The wear leveling feature is denoted by the brace including steps 54 to 56 which are explained later.

If the wear-leveling feature would not be implemented, the block reclaiming process would compare a sample block j in the sequence of blocks with the best block identified so far according to the given criteria. This is accomplished in step 57. The best block so far is registered in the <last> identifier. If the sample block j is better in terms of the criteria than the <last> block, then block j would become the new <last> block, i.e. last=j, see step 58. If the sample block j proves not to be better than <last> block in terms of the criteria, then the best block remains to be the one pointed at by the <last> identifier, and in step 59 it would be verified if there is another block in the sequence waiting to be suggested.

The proposed method, however, introduces a wear-leveling feature, which is implemented by steps 54 to 56. Thus, wherever a new block j is suggested, it is determined in step 54 if such block j is preferred over the <last_WL> block in view of the criteria according to which the <last> block is identified. In other words, it is determined if the present block j under consideration is better in terms of the criteria than the best block identified so far in terms of wear. If this is not the case (no), it is jumped to step 57 where it is determined if the new block j is better than the best block so far in this category in terms of the criteria. This reflects a situation where the presently favored block in view of wear is also better than the new block j in view the other criteria. However, if the new block j is better in terms of these criteria than the presently best block in view of wear, then step 55 applies and the wear level represented by the variable c(j) for block j is compared to the maximum wear level represented by the level assigned to the counter <c_max>. If the wear level of block j is not equal to the maximum level stored in <c_max>, block j becomes the new <last_WL> block.

When the sequence is exhausted, i.e. there are no more blocks suggested, see step 59 (no), then the <last_WL> identifier contains the block to be recycled, see step 62, except if the <last_WL> identifier is equal to minus one or any other value representing an invalid term of wear. When all blocks produce equal wear which is equivalent to a confirmation in step 60 that <last_WL>=−1 no new block could be identified that satisfies the wear criterion in step 55 since all such blocks produce the maximum wear indicated by <c_max>. In this case, the block to be recycled is the one that the block reclaiming process would have recycled when the wear leveling feature were not considered, i.e. <last_WL>=<last>, see step 61. Finally, after recycling the block indicated by the <last_WL> identifier in step 62, its wear counter <c(last_WL)> is incremented by one, also in step 62, and if the wear counter <c(last_WL)> then exceeds the instantaneous maximum wear level <c_max>, the <c_max> variable is also updated in step 62. Then, the process may be stopped in step 63, until a new request for block reclaiming activities is received and triggers initialization in step 50 and a start of the process in step 51.

Clearly, other implementations may be envisaged, such as an embodiment without using the <last> identifier.

The above criteria according to which a block is identified to be the one to be reclaimed without consideration of wear may involve one or more of the following:
- the number of valid pages of a block;
- the number of invalid pages of a block;
- the number of free pages of a block;
- the age of the block;
- the time of the most recent write activity to such block;
- the time of the earliest write activity to such block; and
- the frequency of write activities to such block (i.e. the wear of such block).

The criteria may involve any combination of two or more of the above parameters. The criteria may involve a comparison of any one of the above parameters with a threshold and the criteria may be fulfilled when the parameter is above or below a threshold. The criteria may alternatively be fulfilled if a parameter is found to be below a threshold. The criteria may include a comparison of multiple of the above parameters with individually assigned thresholds, or the criteria may be fulfilled when all the parameters are above or below their respective thresholds. A sample criterion may include "the number of valid pages in the block is less than 12 and an age of the block is less than 100".

A threshold may be a predefined threshold and may not change during operation. A threshold may be predefined and depend on the memory system characteristics. Advantageously, the threshold may be determined in view of the number of pages per block the memory system provides; and/or in view of a ratio between an average number of valid subunits in all blocks and the total number of subunits in the memory. The threshold may be a variable threshold which during operation may take different values. E.g. the threshold may depend on a ratio between an absolute or a floating (average) number of valid subunits in all blocks and the total number of subunits in the memory. The threshold may be an adaptive threshold which may depend on other parameters. The threshold may be adaptive also with respect to previous threshold values, or it may be adaptive with respect to the actual number of valid subunits of previously identified blocks, specifically, if the number of valid subunits in the previously identified block is taken as a new value for the threshold. Or, a moving average of the numbers of valid subunits in the previously identified blocks is taken as a new value for the threshold.

Figure 2:
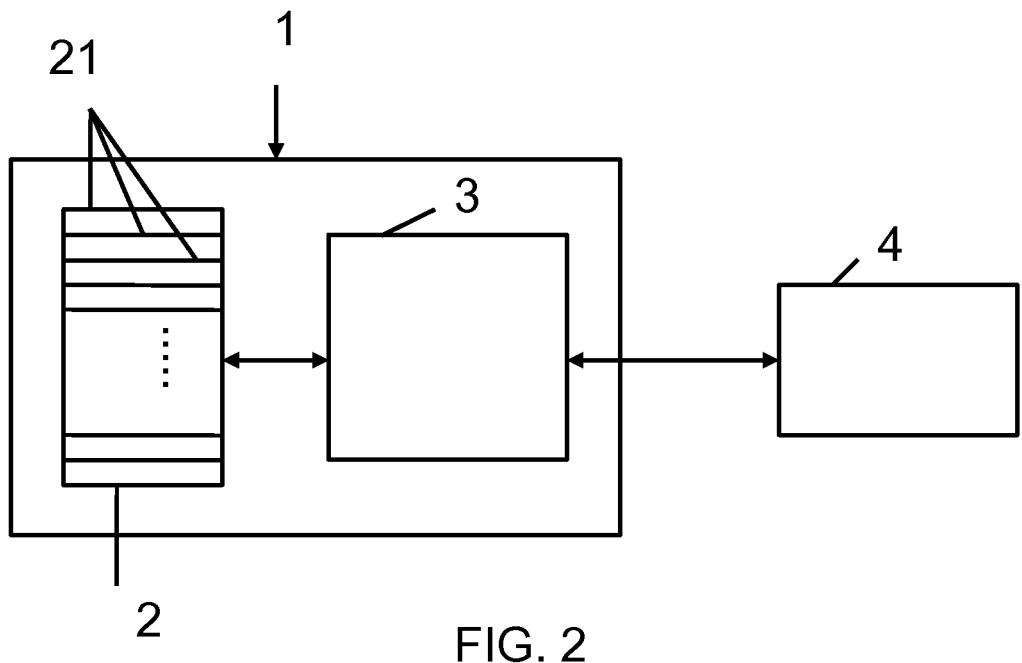
FIG. 2 a block diagram of a storage device according to an embodiment of the present invention.

FIG. 2 shows a block diagram of a storage device according to an embodiment of the present invention. The storage device 1 includes a Flash based solid state memory 2 with a block/page memory space structure. Few of the blocks are indicated as 21. A memory controller 3 is controlling the activities of the flash memory 2—as such the memory can be described as a computer memory. The memory controller 3 specifically is adapted for writing data to and reading data from the memory 2, and for executing all administrative tasks in connection with the reading and writing of data. Specifically, the memory controller 3 writes updates to a page of a block to one or more blocks different to the block the out-dated data is contained in ("write out-of-place"). When doing so, the memory controller 3 flags the one or more subunits containing the out-dated data as invalid. From time to time, the memory controller 3 may execute a search among the blocks—whereas such search may be limited to blocks containing at least one page of invalid data and/or limited according to other criteria—in order to identify one or more blocks matching predetermined criteria. In a preferred embodiment, the search may be stopped when one or a given number of blocks are identified matching the given criteria. Such blocks then build a subset of blocks suggested to a wear leveling routing for being erased.

The memory controller 3 may then implement the wear leveling routine for identifying one or more blocks among the suggested blocks in view of the wear level of each block being compared to the maximum wear level. Only when one or more of the suggested blocks show a wear level less than the maximum wear level exhibited by any of the blocks considered in view of wear, such one or more blocks may be erased.

Prior to erasing, the memory controller 3 initiates a relocation of data of valid pages of this identified block to pages of another block, and possibly even to multiple other blocks. In this context, the memory controller 3 is responsible for running a method according to any of the embodiments descried above. The memory controller 3 further is connected to a host 4 which makes use of the storage device 1 for storing data. Hence, the host 4 issues read and/or write commands to the storage device 1.

Figure 3:
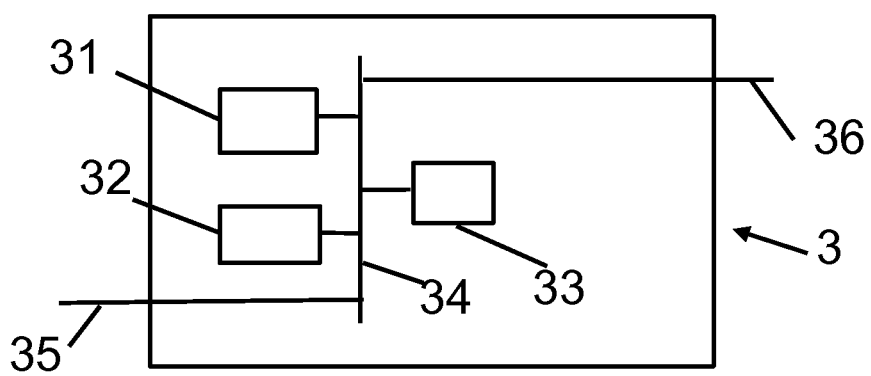
FIG. 3 a block diagram of a memory controller according to an embodiment of the present invention.

In order to implement the method according to any one of the embodiments as described above, the memory controller 3 preferably provides a computer program code preferably stored in a non-volatile, non-rewritable storage medium such as a ROM 31 see FIG. 3. The storage controller further provides a RAM 32 for loading the program code into, and a processing unit 33 for executing the program code in the RAM 32. Internal communication systems 34 are provided for communicating between the components of the memory controller 3, and an interface 35 is provided for communicating with the flash memory, while another interface 36 may be provided for any communication with the host.

Figure 4:
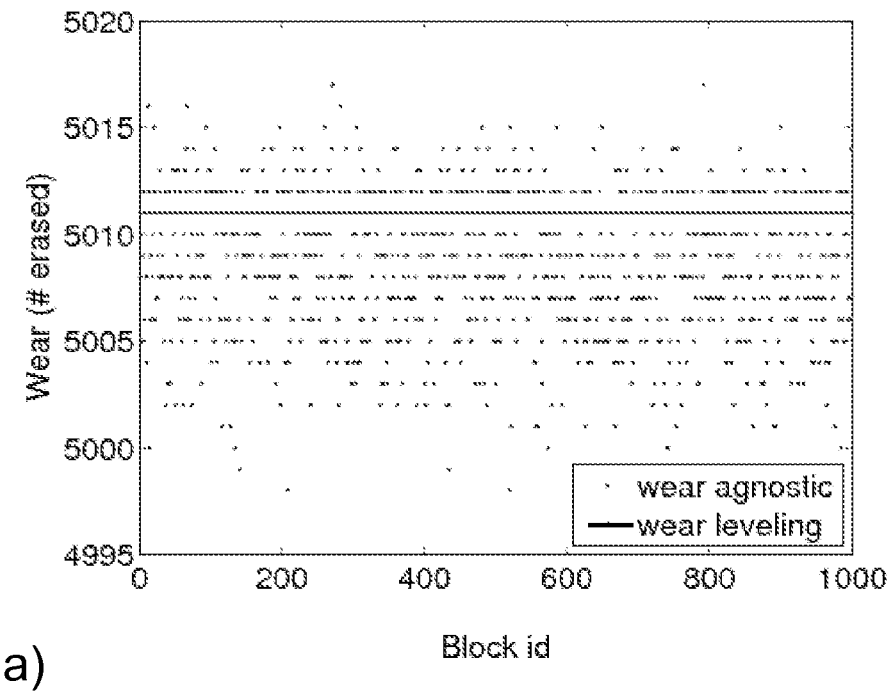
FIG. 4 two diagrams demonstrating the improvement in wear leveling achieved by the present method.
Figure 4:
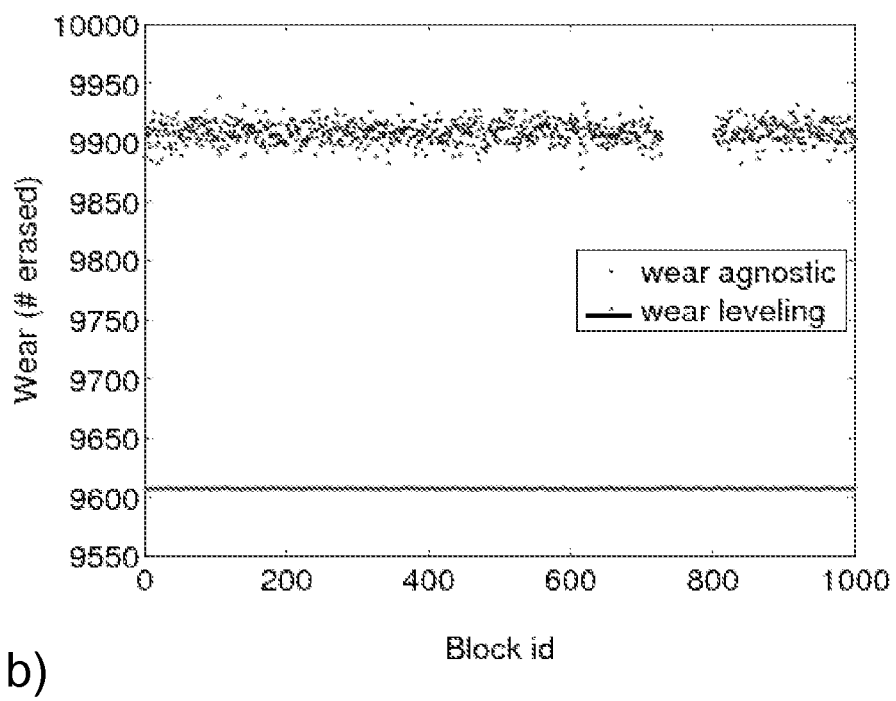

In the diagram of FIG. 4*a*) the wear equivalent to the number of erased cycles applied to a block is depicted of multiple blocks with block ids 0 to 1000, i.e. for thousand blocks. It turns out that the proposed wear leveling method ensures that all blocks in the system have essentially the same wear throughout the operation of the device. In the present example, a memory device is considered with 16 pages per block, 1000 blocks, and occupancy of 0.8, operating under random small writes. FIG. 4*a*) depicts in small dots the wear of blocks after 30 million user write operations under the assumption that a windowed greedy garbage-collection scheme is applied with a window size equal to 10. This implies that the block selected for erasing is the block among the first 10 most aged blocks that has the least number of valid pages. From the diagram in FIG. 4*a*) it can be observed that the wear of blocks has a variation between 4998 and 5017 erases per block. In contrast, by applying the proposed wear leveling scheme a nearly uniform wear of all blocks is achieved of 5011 or 5012 erases per block, as illustrated in FIG. 4*a*) by the two horizontal lines. In effect, the proposed method leads to a nearly uniform utilization of all blocks when the memory device reaches the end of its lifetime, whereas if the proposed method were not applied, a significant number of blocks would have been underutilized.

With respect to the diagram in FIG. 4*b*), it is considered the case of hot and cold traffic and is assumed that 9% of the blocks, i.e. 90 blocks, contain static (cold) addresses. A static address contains data which is not changed too much over the lifetime of the memory device. FIG. 4*b*) depicts in small dots the wear of the blocks after 60 million user write operations when the windowed greedy garbage-collection scheme is applied, with a window size equal to 100. It can be observed that 9% of blocks have a wear of 1 (not shown), whereas the wear of the remaining blocks has a variation between 9878 and 9938 erases per block (small dots). Applying the proposed method yields a uniform wear of all blocks of 9607 or 9608 erases per block, as illustrated in FIG. 4*b*) by the horizontal line. In effect, the proposed method leads to a nearly uniform utilization of all blocks when the memory device reaches the end of its lifetime, whereas if the proposed method were not applied, a significant number of blocks would have been underutilized.

In the present example, it may illustratively be assumed that the endurance of blocks is equal to 9918 cycles and that the device is declared as unusable if 15% of the blocks are no longer operational. Then, in the case of absence of the present wear-leveling method the device would have been declared as unusable after 60 million user writes. By contrast, applying the proposed wear leveling method allows for a significant number of additional writes, given that none of the blocks has reached its endurance after 60 million user writes. For the considered example, this allows for an additional (9918−9607)*1000*16=5 million user writes before declaring the device unusable, which corresponds to an 8% increase of the device lifetime. This increase in lifetime is obtained without introducing additional procedures and complexity to ensure that the wear is maintained within limits to prevent the device to be declared unusable.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. Method for operating a computer memory, the memory being organized to store data in a set of units of the memory, the method comprising:

maintaining and updating a first identifier that identifies a unit that presently is a best candidate unit for reclaimation in view of a criteria other than a wear level, and maintaining and updating a second identifier that identifies a unit that presently is a best candidate unit selected for erasure in view of wear levels associated with blocks of the subset;

determining a wear level of each of the units of the set and identifying a maximum wear level among the determined wear levels;

receiving suggestion of a subset comprising one or more units for being selected for data erasure;

determining whether a suggested unit of said subset is preferred over said unit identified by said second identifier in view of the criteria according to which the first identifier of the best candidate unit is identified, and responsive to a determining that the suggested unit of said subset is preferred over said unit identified by said second identifier:

comparing the wear level of said preferred suggested unit in the subset to the maximum wear level; and if the wear level of said suggested unit is less than the maximum wear level, then updating said second identifier with the identification of said suggested unit, otherwise, if it is determined that the suggested unit of said subset is not preferred over said unit identified by said second identifier; or if said wear level of said suggested unit is not less than the maximum wear level, then determining whether the suggested unit is better than the best block in terms of the criteria according to the unit identified by said first identifier; and if the suggested unit is better over the best block identified by said first identifier, then updating said first identifier with the identification of said suggested unit, otherwise, if said suggested unit is not better than the best unit identified by said first identifier, and upon further determining more units to process, and that the second identifier is not at its initial value, causing for recycling said suggested unit identified by said second identifier in the presence of a wear-leveling feature, and incrementing a value of the maximum wear level;

otherwise, if determined that there are more units to process, and that the second identifier is at its initial value, then updating a second identifier that identifies a unit with the unit currently associated with said first identifier as the block for recycling; and causing for recycling said suggested unit identified by said second identifier in the presence of a wear-leveling feature, and incrementing a value of the maximum wear level; and repeating for all unit of said subset, the wear level determining, the receiving, the preference determining, the responding by comparing, the incrementing, and the recycling.

2. Method according to claim 1, wherein the wear level of at least one unit of the set is determined based on a count of erasures applied to said at least one unit the count of erasures being increased each time the unit is erased.

3. Method according to claim 1, wherein said one or more units of the subset are suggested for being selected for data erasure subject to a characteristic of data stored in said one or more units of said subset.

4. Method according to claim 1, wherein each unit of the set of units comprises a set of subunits, and wherein said one or more units of said subset are suggested for being selected for data erasure subject to a number of the subunits of the one or more units of said subset containing valid data.

5. Method according to claim 1, wherein the step of identifying comprises for at least one unit in the subset comparing the wear level of said unit to the maximum wear level.

6. Method according to claim 5, wherein said subset comprises more than one unit wherein the units of the subset are sorted according to a characteristic other than wear levels associated to the units of the subset, and wherein at least one of the units of the subset having a preferred characteristic and a wear level less than the maximum wear level is identified for subsequent data erasure.

7. Method according to claim 1, wherein the subset comprises a single unit suggested for being selected for data erasure.

8. Method according to claim 1, wherein said subset comprises more than one unit, and wherein the units of the subset are considered for subsequent data erasure consecutively.

9. Method according to claim 1, wherein each unit of the set of units comprises a set of subunits, and wherein the first identifier identifies a unit that presently is preferred in view of a number of its subunits containing valid data.

10. Method according to claim 1, wherein if the wear level of each unit of the set is equal to the maximum wear level, a unit is identified for data erasure that is preferred in view of a characteristic other than wear levels associated to the units of the subset.

11. Method according to claim 10, wherein each unit of the set of units comprises a set of subunits, and wherein the unit selected for erasure is preferred in view of a number of its subunits containing valid data.

12. Method according to claim 1, wherein the step of identifying comprises, for each unit of the subset, dropping said unit from being selected for data erasure if the wear level of said unit is equal to the maximum wear level unless the wear level of each of the other units of the set is equal to the maximum wear level.

13. A computer program product comprising a non-transitory computer readable medium having computer readable program code embodied therewith, the computer readable program code comprising computer readable program code configured to perform a method according to claim 1.

* * * * *